United States Patent Office 3,123,328
Patented Mar. 3, 1964

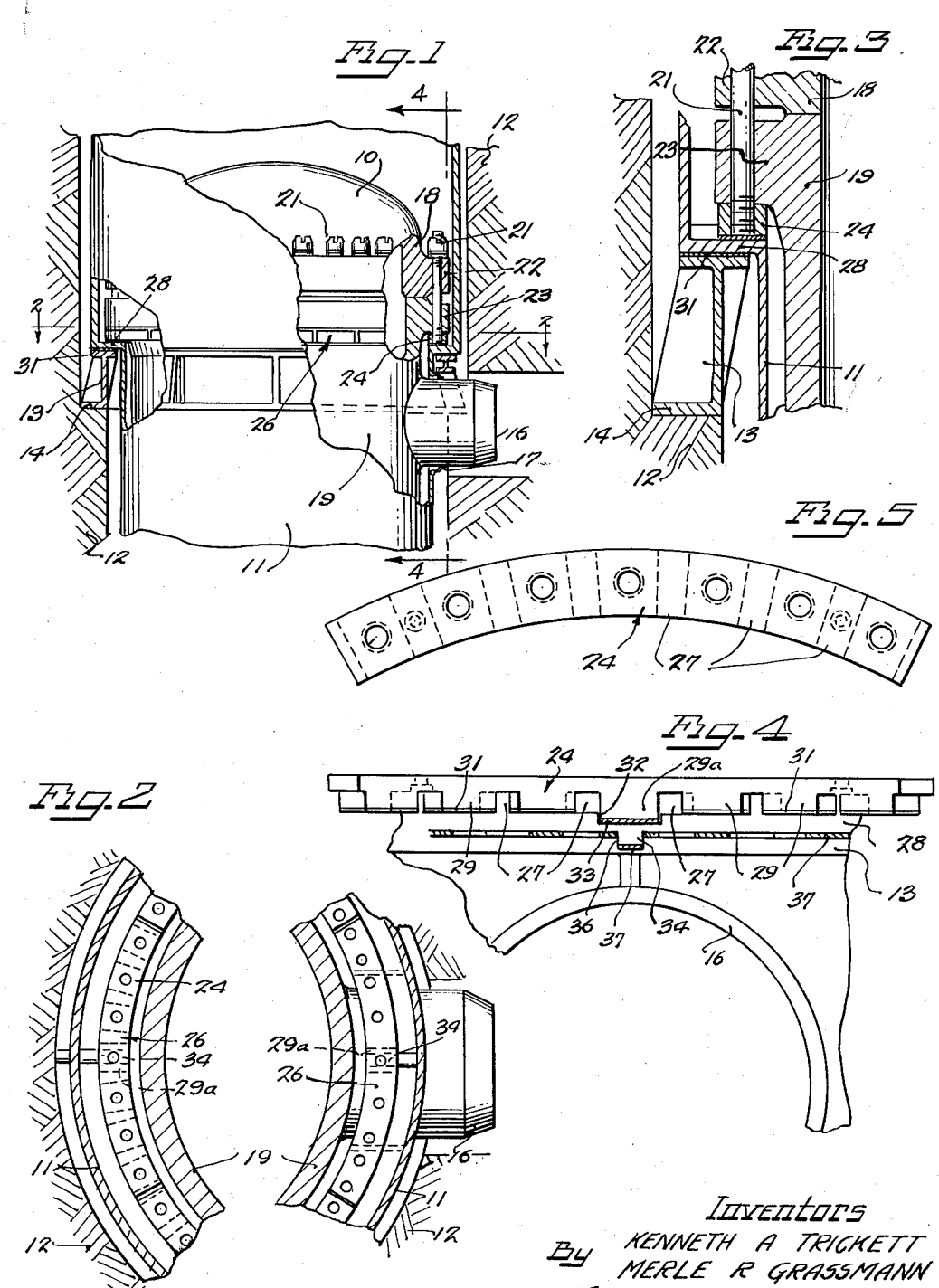

3,123,328
SUPPORT STRUCTURES
Kenneth A. Trickett, San Diego (La Jolla), and Merle R. Grassmann, Solana Beach, Calif., assignors, by mesne assignments, to the United States of America as represented by the United States Atomic Energy Commission
Filed Oct. 30, 1961, Ser. No. 148,771
4 Claims. (Cl. 248—1)

This invention relates to support structures and more particularly to a support structure for a unit such as a reactor pressure vessel or similar housing which experiences thermal expansion and contraction and a corresponding movement relative to fixed components associated therewith.

Numerous power producing units which operate at high temperatures are being developed for use as power sources to effect the propulsion of ships and other vehicles. Recent technological advances have shown that one very feasible type of power source for such applications is a closed-cycle gas turbine system that includes a neutronic reactor as the source of thermal energy. Quite generally, such a closed-cycle system includes, among other things, the reactor, a ducting arrangement and a turbine which is connected to the reactor through the ducting arrangement.

During normal operation of such a system, the pressure vessel for the reactor core as well as the ducting arrangement will experience thermal expansion and contraction. These forces of thermal expansion and contraction, which result from variations in temperature conditions, create problems in suitably connecting the ducting arrangement to the pressure vessel and turbine so that undue stresses are not imparted to the ducting which may lead to a malfunction of the total system. The problems of suitably joining the elements of the closed-cycle system become even more critical due to space limitations imposed on the system when designed for a ship board installation.

Manifestly, if a fixed reactor is utilized in conjunction with a fixed turbine, a suitable flexible ducting arrangement must be designed to accommodate variations in the relative positions of these units resulting from thermal expansion or contraction. Such compensation in the ducting arrangement is necessary so that the forces imparted to the ducting are held within allowable limits. In an attempt to overcome these problems, expansion joints and bellows have been tried as possible methods of linking the ducting arrangement to the reactor vessel. In addition, concentric ducting rather than single pipe ducting has been utilized so that variations in pipe length are further reduced. Past experience has shown that difficulties arise when expansion joints are utilized with a concentric ducting arrangement, and the necessity of utilizing internal insulation in a high temperature system effectively limits the use of bellows.

It is a prime object of the present invention to provide an improved support structure for a pressure of similar containment vessel which forms one part of a high temperature system.

A further object of the present invention resides in the provision of a support structure which can be adapted for use with a pressure vessel or the like so that thermal expansion and contraction of the vessel and a ducting arrangement associated therewith can be accommodated.

Still another object of the invention resides in the provision of a support structure for use with a pressure vessel which not only accommodates thermal expansion and contraction but also allows controlled limited movement of the vessel relative to fixed components associated therewith. Other objects and advantages of the present invention will become apparent from the following detailed description thereof when considered in conjunction with the accompanying drawing, wherein:

FIGURE 1 is a fragmentary elevational view partially in cross-section illustrating one type of pressure vessel provided with a preferred embodiment of the support structure contemplated by the present invention;

FIGURE 2 is an enlarged fragmentary horizontal cross-sectional view taken along the line 2—2 in FIGURE 1;

FIGURE 3 is an enlarged fragmentary sectional view which more clearly illustrates the structural features of the support structure provided for the vessel illustrated in FIGURE 1;

FIGURE 4 is an enlarged fragmentary sectional view taken along the line 4—4 in FIGURE 1 which illustrates a portion of a preferred embodiment of the support structure; and FIGURE 5 is a plan view of the structure illustrated in FIGURE 4.

In general, a support structure of the type contemplated by the present invention is constructed for use with various types of pressure or other containment vessels whereto a ducting arrangement is secured which communicates with the vessel and with a fixed power producing means associated therewith in a closed-cycle system. In accordance with the provisions of the invention, the support structure includes a support member which is secured to the vessel and mounted for movement on a main supporting housing therefor. A secondary support means is provided intermediate the support member and the main supporting housing which permits radial expansion and contraction of the vessel and allows limited movement of the vessel in a horizontal direction toward or away from the ducting arrangement. The mating or contacting surfaces of the support member, secondary support means and main supporting housing are separated by layers of material which insure that these mating surfaces are characterized by a low coefficient of friction so that the aforementioned movement is facilitated.

The support structure contemplated by the present invention can be adapted for use with any number of pressure or containment vessels which are subjected to expansion and contraction as a result of variations in the working temperature of the vessel and/or which are subjected to movement relative to other instrumentalities which comprise the system in which the vessel is incorporated. However, for purposes of illustration the support structure will be hereinafter described in conjunction with and as designed for supporting a pressure vessel that is structurally and functionally similar to the internally insulated and externally cooled pressure vessel disclosed and claimed in the copending application of the common assignee, Serial No. 153,270 which was filed on November 16, 1961. Although the support structure is to be hereinafter described as provided for a vessel of this type, it should be understood that numerous other pressure and containment vessels could be suitably adapted with such a support structure, and this description is not to be deemed as limiting the applicability of the invention to this particular type of vessel.

Referring to FIGURE 1, there is disclosed a cylindrical pressure vessel 10 that is disposed within an external cylindrical coolant tank 11 which is in turn mounted within a main housing or support structure 12. The pressure vessel 10 and coolant tank 11 are supported within the structure 12 on an annular support skirt 13 which is secured to a ledge portion 14 that extends in concentric relation about the outer surface of the tank. A concentric nozzle arrangement 16 passes through a suitably sealed aperture 17 in the coolant tank 11 and communicates with the internal portion of the pressure vessel 19. A concentric ducting arrangement (not shown) is connected to the nozzle arrangement 16 and serves to carry a supply of a suitable gas coolant to and from the pressure vessel. The ducting arrangement forms one part of a closed-cycle gas turbine system which includes a power turbine that is fixed in relation to the ducting arrangement and pressure vessel 10.

As illustrated, the pressure vessel 10 has an upper dome shaped cover 18 that is suitably secured to a reactor confining main cylindrical body portion 19 by a plurality of studs or bolts 21. The bolts 21 extend through an annular flange 22 of the cover 18 as well as a flange 23 of the body portion 19. Referring to FIGURE 3, the lower extremities of each of the bolts 21 are secured within threaded apertures provided in a number of individual support members 24 each of which forms one segment of an annular bearing and nut ring, primary support structure 26.

In a preferred embodiment of the invention, six of the individual support members 24 are assembled to form the annular bearing and nut ring support structure 26, and each of the individual support members mates with adjacent ones of the support members. To accommodate this mating and the assembly of the annular supporting structure 26, the extremities of each of the individual support members 24 are suitably flanged (FIGURE 4) to complement the flanged extremities of the members which are situated adjacent thereto. Accordingly, when the individual support members are threadably secured to the flange 23 by the studs or bolts 21, the overlapping flanged end portions of the members will insure that a continuous annular support structure is provided.

The lower surfaces of each of the members 24 forming the annular support structure 26 are recessed to provide a plurality of uniformly spaced channels 27 therein. The channels allow a coolant to circulate within the tank 11 from a position below a flange or shoulder 28 formed in the coolant tank to a location above this flange and across the outer surface of the vessel 10. As illustrated in FIGURE 4, the channels 27 are rectangular in shape and are arranged so that a plurality of uniformly spaced segments 29 are provided therebetween. The lower surfaces of these segments bear against the shoulder 28 of the tank 11 which in turn bears against and is supported on the upper surface of the reactor support skirt 13. In a preferred embodiment of the invention, each of the support members 24 is recessed so that seven support segments 29 are provided. In addition, a plurality of suitable low friction pads 31, which complement the configuration of the lower faces of the segments 29, are secured thereto and bear directly against the shoulder 28 when the support structure 26 is assembled and secured in supporting relation to vessel 10. The pads are preferably fabricated from a material such as Lubrite, which is compatible with high temperatures and resists the harmful effects of any radiation emanating from the vessel.

As shown, a centralmost segment 29a projects below the other segments 29 and is suitably situated within a slot 32 provided in the shoulder 28 of the tank. Similarly, each of the other support members 24 included in the assembled support structure 26 is provided with at least one projecting segment 29a that mates with other suitably proportioned slots 32 provided in the upper surface of the circumferential support shoulder of the tank so that the entire annular support structure is precluded from movement in a tangential direction relative thereto. However, each of the mating segments 29a is also provided with a suitable low friction pad 33 that is secured along the lower face thereof to facilitate movement of the segments within the slots 32 in a radial direction to accommodate expansion and contraction of the vessel.

The flange or shoulder 28 of the coolant tank 11 is constructed in a manner somewhat similar to the annular support structure 26. More particularly, the shoulder of the tank serves as a secondary support means so that movement of the tank and vessel relative to the upper surface of the support skirt 13 is permitted. In this connection, the shoulder 28 (FIGURE 4) is provided with two diametrically opposed keys 34. The keys are formed on and project downwardly from the shoulder and lie in a vertical plane passing through the center line of the nozzle arrangement 16. Each of the keys 34 is proportioned to mate with a pair of diametrically opposed slots 36 provided in the reactor support skirt 13. The slots are proportioned to accommodate movement of the keys therein so that movement of the tank and the vessel in a horizontal direction along the center line of the nozzle arrangement 16 is permitted, while any other movement is precluded.

As was the case with the lower faces of the segments 29 and 29a of the support members 24, the lower faces of the support shoulder 28 and keys 34 have layers 37 of low friction padding secured thereto. The low friction padding 37 is preferably formed of the same material as the pads 31 which will facilitate forced movement of the tank across the upper surface of the support skirt 13. If desired, the padding 37 can be recessed to allow circulation of air about the outer surface of the tank.

As previously set forth, the complementing structural features of the annular support structure 26 and keyed shoulder 28 of the tank 11 are such that radial expansion and contraction of the vessel relative to the flange is permitted. In addition, movement of the tank and vessel as a unit across the upper surface of the support skirt 13 is accommodated. The manner in which such movements are effected to relieve stress and other forces which tend to be imparted to the ducting arrangement will best be understood from the following description.

During operation of the neutronic reactor core confined within the vessel, variations in temperature conditions will occur. These temperature variations will cause thermal expansion and contraction of the vessel and the ducting arrangement that will tend to set up harmful forces in the latter. For example, if expansion of the vessel occurs, the nozzle arrangement 16 will tend to impart a compressive force against the ducting which is secured thereto. However, the force with which the nozzle bears against the ducting will be relieved by the movement of the vessel and the tank across the upper surface of the support skirt.

Considering this movement in greater detail, it will be appreciated that radial expansion of the vessel tends to move the nozzle arrangement 16 toward the ducting to which it is secured (slight radial expansion can occur without harmful consequences). Should a substantial amount of expansion occur, the expanding force imparted to the concentric ducting will be met with an equal and opposite force applied against the nozzle. This reactive force will urge the vessel away from the connection of the nozzle and ducting since the ducting is secured at the opposite extremity to the fixed turbine. Inasmuch as each of the support members which constitute the annular support structure 26 is provided with a mating segment 29a slidably secured within the slots 32 formed in the upper surfaces of the shoulder 28, the reactive force experienced by the vessel will be imparted to the flange of the tank. Since the flange 34 and the slots 36 are aligned with the center line of the nozzle arrangement 16, this force will be translated into movement of the tank and the vessel across the support skirt 13. Accordingly, the tank and vessel will move a sufficient distance relative to the support skirt to relieve the adverse compressive force which tend to develop in the ducting arrangement.

Similarly, if the vessel and/or ducting experiences contraction, a compensating or relieving force will be imparted to the vessel which will be transmitted to the supporting shoulder or flange of the tank. Such a force will move the tank and the vessel toward the connection of the nozzle and the ducting arrangements. In this way, stress forces are also relieved from the ducting arrangement.

In addition, when adapted for utilization as the power source for a ship, the closed-cycle system including the vessel 10 will be situated within the ship's hull portion. If, for example, the ship is subjected to rough seas, forces imparted to the hull will tend to effect a flexing thereof and a change in the position of the pressure vessel and tank relative to the fixed turbine. To accommodate this relative movement and to insulate the ducting from the harmful effects thereof, the tank and the vessel will move relative to the support skirt 13 in the manner previously described. That is, the keyed shoulder 28 will advance fore and aft in a direction along the center line of the ducting and relative to the support skirt to relieve the forces imparted thereto. It should be understood that the forces required to effect a change in the position of the vessel and tank relative to the support skirt must be rather substantial (i.e., corresponding to forces which would tend to buckle the ducting) so that the vessel and tank are not to be construed as being in a constant state of motion within the housing 12.

The complementing structural features of the primary annular support structure 26 and the shoulder 28 (acting as a secondary support means) have been described as provided for a particular type of pressure vessel that is confined within a coolant tank mounted in a main support housing. With other types of pressure or containment vessels, the annular support structure 26 and the secondary support means 28 would be constructed in a somewhat different manner. For example, a conventional type of pressure vessel provided with the support structure contemplated by the present invention would not be disposed within an external coolant tank. Accordingly, the secondary support means, while being constructed in a manner similar to the shoulder 28 of the tank 11, would preferably be an annular ring constructed in much the same manner as the shoulder, but communicating only with the annular support structure 26 and the main support housing 12. In addition, with other types of pressure or containment vessels the annular support structure could be composed of a fewer number of individual mating members that may or may not be recessed to define coolant passages or channels therein. When so constructed, the entire lower face of each of the support members forming the primary annular support structure would have secured thereto sheets of a suitable low friction material that would insure that radial movement of the primary support structure relative to the secondary support structure could be readily effected.

Other changes and modifications may be made in the above described support structure without departing from the spirit or scope of the present invention, various features of which are set forth in the accompanying claims.

What is claimed is:

1. Apparatus for supporting a flanged pressure or similar containment vessel within a main supporting housing so that radial and bi-directional movement of the vessel is permitted to relieve forces imparted thereby to fixed components associated therewith as a result of thermal expansion and contraction of the vessel, which apparatus comprises an annular support ring secured in fixed relation to the flange of the vessel, said annular support ring including a plurality of arcuate shaped members that are secured to the flange in mating relation with each other, each of said members being provided with at least one projecting mating key extending downwardly therefrom, a secondary support means secured below and in mating contact with said annular support ring and having a plurality of uniformly spaced slots provided therein that are proportioned to accommodate the mating keys of each of the support members that form said annular support ring, said secondary support means having a pair of diametrically opposed mating keys extending downwardly therefrom and longitudinally aligned parallel to said bi-directional movement of said vessel, and an annular support member mounted in fixed relation within the main supporting housing, said annular support member having two diametrically opposed slots provided therein to receive the mating keys of said secondary support means which is mounted thereon so that upon expansion or contraction of said pressure vessel movement of said annular support ring will be imparted to said secondary support means to effect movement of the vessel relative to said main supporting housing.

2. Apparatus for supporting a vessel at a generally horizontal periphery thereof so that both minor radial movement in a horizontal plane and minor bi-directional linear movement in one horizontal line are permitted, which comprises an annular support ring secured in fixed relation to and extending radially outward from said generally horizontal periphery of the vessel and defining a multiplicity of downwardly projecting keys oriented in horizontally radial fashion, an annular secondary support ring disposed horizontally below first said support ring, said secondary ring affording a horizontal top surface upon which said first ring is adapted to rest and defining a multiplicity of upwardly open radial slots adapted to accommodate respectively said keys thereby affording only horizontally radial relative movement between two rings, said secondary support ring further defining at least one more downwardly projecting key longitudinally aligned parallel to said horizontal line of bi-directional movement, and a base support means affording a generally horizontal top surface upon which said secondary ring is adapted to rest and defining at least one more upwardly open slot adapted to accommodate said one more downwardly projecting key, thereby affording only bi-directional relative motion in said horizontal line between said secondary support ring and said base support means.

3. The apparatus of claim 2 wherein said secondary support ring in further defining at least one more downwardly projecting key defines two such keys, and said base support means in defining at least one more upwardly open slot defines two such slots.

4. The apparatus on claim 3 wherein said two more downwardly projecting keys are longitudinally aligned in the vertical plane of said horizontal line of bi-directional movement.

UNITED STATES PATENTS

References Cited in the file of this patent

| | | |
|---|---|---|
| 1,909,670 | Evans | May 16, 1933 |
| 2,021,370 | Mallay | Nov. 19, 1935 |
| 2,890,009 | Chapellier | June 9, 1959 |